W. P. PENN.

Grain Drill.

No. 2,467. Reissued Jan. 29, 1867.

Witnesses:

Amos Broadway

A. B. Gray

Inventor:

W. P. Penn

AM. PHOTO-LITHO. CO. N.Y. (OSBORNE'S PROCESS.)

UNITED STATES PATENT OFFICE.

W. P. PENN, OF BELLEVILLE, ILLINOIS.

IMPROVEMENT IN SEEDING-MACHINES.

Specification forming part of Letters Patent No. 26,611, dated December 27, 1859; Reissue No. 2,467, dated January 29, 1866.

*To all whom it may concern:*

Be it known that I, WORDEN P. PENN, of Belleville, in the county of St. Clair and State of Illinois, have invented certain new and useful Improvements in Seeding-Machines; and I do hereby declare that the following is a full, clear, and exact description of the same, reference being had to the accompanying drawings, and to the letters of reference marked thereon.

Figure 3:
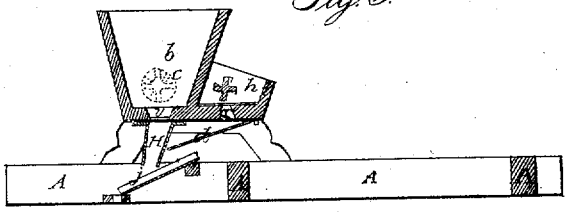
Figure 2:
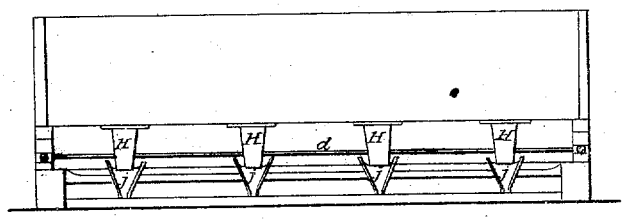
Figure 1:
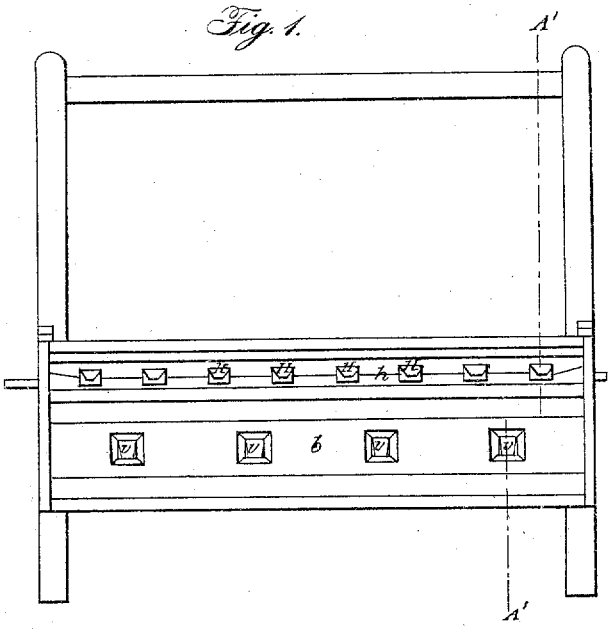

In the annexed drawings, making part of this specification, Figure 1 represents a plan view. Fig. 2 is a front elevation. Fig. 3 is a transverse section through A A′.

My improvement consists in a certain arrangement and construction of the seed-box, in which is combined a grass-seed and grain-seed hopper in a peculiar manner, and also in combining and arranging therewith a spreader for the grass-seed, which conveys it back and spreads it without the aid of working machinery of any kind; and, as the invention relates only to the hopper-box and its immediate attachments, I shall confine this specification more particularly to them.

In the drawings, *b* represents the grain-box, and *a* the feeding-wheel, arranged longitudinally in it. *v* represents a hole or opening in the bottom of the box *b;* H, a pipe, and *j* a leader through which the grain falls to the ground.

The grain-hopper and the grass-seed hopper are constructed in one box, and simply divided by a partition-board, the grass-seed hopper being situated in front of the grain-hopper.

The object in having the grass-seed hopper in front is that the grass-seed may be carried back toward the grain as it falls and be distributed amidst of the rolling earth, causing it to mix with it and thus insure its coming up more regularly over the whole ground. If the grain-hopper were in front, this could not be effected, so it is evident that the relative positions of the two hoppers is very important, in this class of machine, where grass-seed is to be sown with grain. When the small grass-seed falls upon the earth as it rolls up from the teeth which open furrows for the grain it will readily be seen that it is more effectively scattered and distributed over and in the ground than it would be otherwise.

*h* represents the feeding-wheel in the grass-seed hopper, and *x* the hole through which said seed is discharged from the hopper upon the spreader *d*. This spreader is secured to the under side of the seed-box, being set at an angle, as shown, so as to carry the grass-seed back toward the grain.

It will be seen that the hole *v* is made with a flare in the top side, and that the hole *x* is made with a flare in the under side. The object of making the bottom or lower part of hole *v* smaller than its top is to cause the grain to leave it in a small regular stream, and the object of making the hole *x* largest at the lower side or end is to induce the seed to spread and fall scatteringly upon the deflector or spreader *d*.

I am aware that a seed-hopper has been combined with a grain-hopper before, and that machines have been constructed in this respect to do all that this machine does, but differently constructed and arranged.

Having thus fully described my invention, I claim—

1. So combining a grain-hopper and a grass-seed hopper in a seeding-machine that the grass-seed hopper, being in front of the grain-hopper, shall distribute its seed in advance of the grain and amidst of the rolling earth as it is lifted by the teeth of the drill, substantially as and for the purpose specified.

2. So combining a deflector with a grass and grain seed hopper, combined as specified, that said deflector shall deliver the grass-seed in advance of the grain and upon the upturning earth, substantially as and for the purpose specified.

As evidence that I claim the foregoing, I have hereunto set my hand.

W. P. PENN.

In presence of—
AMMON H. LUTZ,
C. L. PRIMM.